United States Patent
Coulson

(10) Patent No.: US 6,345,349 B1
(45) Date of Patent: Feb. 5, 2002

(54) COMBINED MEMORY AND MASS STORAGE DEVICE

(75) Inventor: Richard L. Coulson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/222,951

(22) Filed: Dec. 30, 1998

(51) Int. Cl.$^7$ .............................................. G06F 12/02
(52) U.S. Cl. ........................ 711/173; 711/153; 703/24
(58) Field of Search ................................. 711/173, 153, 711/127, 103; 714/180; 703/21, 24

(56) References Cited

U.S. PATENT DOCUMENTS

| | | | |
|---|---|---|---|
| 5,317,718 A | * | 5/1994 | Jouppi ........................ 395/425 |
| 5,535,357 A | * | 7/1996 | Moran et al. ................ 395/430 |
| 5,924,113 A | * | 7/1999 | Estakhri et al. ............. 711/103 |
| 5,966,727 A | * | 10/1999 | Nishino ....................... 711/127 |
| 6,065,077 A | * | 5/2000 | Fu .............................. 710/100 |

* cited by examiner

*Primary Examiner*—Hiep T. Nguyen
(74) *Attorney, Agent, or Firm*—Antonelli, Terry, Stout & Kraus, LLP

(57) ABSTRACT

A low-cost computing device utilizes a fast access mass storage device with microsecond access times for both its mass storage and main memory requirements. The storage device is configured with a DRAM-like memory electrical interface with a special "doorbell" or interrupt capability. Most of the memory in the storage device is configured as conventional mass storage, and the remainder is configured as main memory.

21 Claims, 4 Drawing Sheets

COMBINED MEMORY AND MASS STORAGE DEVICE

BACKGROUND OF THE INVENTION

1. Field of the Invention

This invention relates generally to the memory arrangement of computing devices. In particular, the present invention relates to the use of a single high speed mass storage memory as a unitary memory in a computing device.

2. Description of the Related Art

FIG. 1 illustrates the general configuration of the typical memory arrangement in a personal computer. As shown, a central processing unit (CPU) works with two types of memories. The main memory, usually implemented as volatile dynamic random access memory (DRAM), stores data used by the CPU during processing. A separate mass storage memory, typically a hard drive with a rotating media disk, is also provided to store large amounts of data which are expected to be accessed only infrequently by the CPU. Because there are two different types of memories, there are also separate memory controls, etc., for controlling the different memories, such as DRAM control for the DRAM main memory and a disk drive interface unit for the disk drive.

Such a memory architecture increases complexity and cost. Separate chips are typically used for the different interfaces, thus increasing the number of pins and physical space required for memory. The presence of both types of memory tends to impart the computing device with the disadvantages of each. The storage of large amounts of data in a relatively slow mass storage device obviously degrades performance. But, in addition, DRAM typically requires a large amount of power consumption, which increases roughly in proportion with the size of the memory. The volatile nature of the DRAM memory also means that time is needed for boot-up after the computing device is turned on, thus making the device unavailable for immediate use.

Radically different storage techniques have recently been proposed and described as improving the performance of mass storage devices. These include a variety of probe based storage devices and electron beam storage devices (see, for example, U.S. Pat. Nos. 5,446,687, 5,546,337 and 5,604,706 assigned to Terastore, Inc.). The access time of fifty microseconds for these devices is about ½ooth of the access time offered by present disk drives.

Another category of recently developed devices, referred to as optical polymer or polymer memory, may have access times as low as one microsecond, which is ½oooth to ¹⁄10000th that of presently available disk drives. These devices have been described in, for example, patent documents WO 09733275 and WO 09724715, assigned to Opticom ASA.

Despite the development of these new types of mass storage memories, computing devices typically employ a standardized operating system (OS) to control the transfer of data between a central processing unit and connected memories. The operating system was developed with the assumption that the device would have the memory arrangement shown in FIG. 1 and contains instructions for controlling the transfer of data between main memory and a disk drive serving as mass storage memory. Therefore, even though there may be advances in mass storage memories, the overall performance of the devices will not increase commensurately because their operating systems operate on the assumption that there will be a memory arrangement as shown in FIG. 1.

SUMMARY OF THE INVENTION

The present invention is directed to a method of utilizing a high speed mass storage device in a low-cost computing device. In a first aspect of the invention, a memory device includes a mass storage memory configured into a main memory portion and a mass storage portion; and a memory access unit, the memory access unit storing the configuration data marking the partition between the main memory portion and the mass storage portion of the mass storage device and controlling the transfer of data to and from the mass storage memory according to whether the data is located in the main memory portion or the mass storage portion.

DETAILED DESCRIPTION

The present invention is directed to an exemplary memory arrangement for a computer utilizing a high speed mass storage device to perform both the main memory and mass storage functions. An exemplary application of the invention is in a basic PC platform, such as a sub-$1,000 PC wherein cost considerations are an important factor. However, the invention may also be applied in other computing devices, such as consumer electronics equipment, handheld computers, etc., which require non-volatile storage of large amounts of data but not high performance in processing and memory access times. Indeed, the invention may be applied to replace the DRAM in any computing device.

Figure 1:
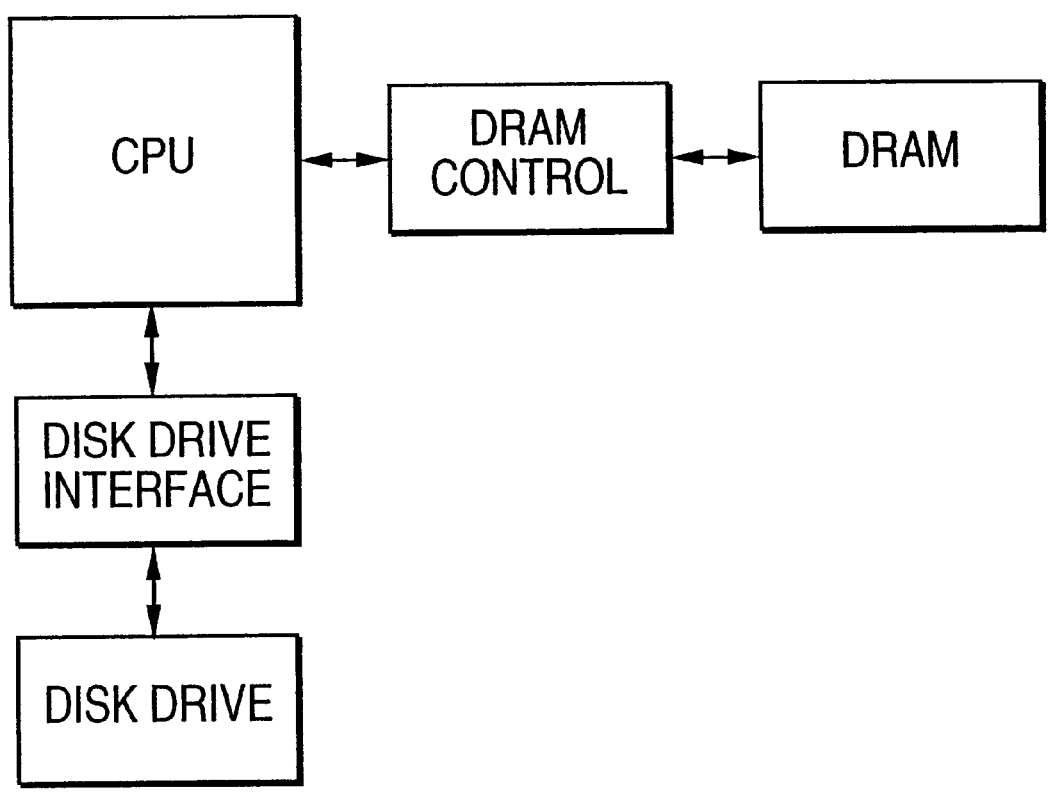
FIG. 1 is a generalized block diagram providing a basic illustration of a memory arrangement in a personal computer (PC).

In particular, the example embodiments of the invention are applicable to computing devices having an operating system, such as that described above, where the operating system was developed with the assumption that the device would have a memory arrangement such as that shown in FIG. 1 and contains instructions for controlling the transfer of data between main memory and a disk drive serving as mass storage memory. The example embodiments allow the combined main memory and mass storage device thereof to be transparent to the operating system and permit the use of existing disk drive protocols and conventions, etc, currently utilized in such software. All currently known operating system software makes assumptions relating to the arrangement of separate main memory and mass storage memory, and protocols for transfer of data into and out of those memories.

Figure 2:
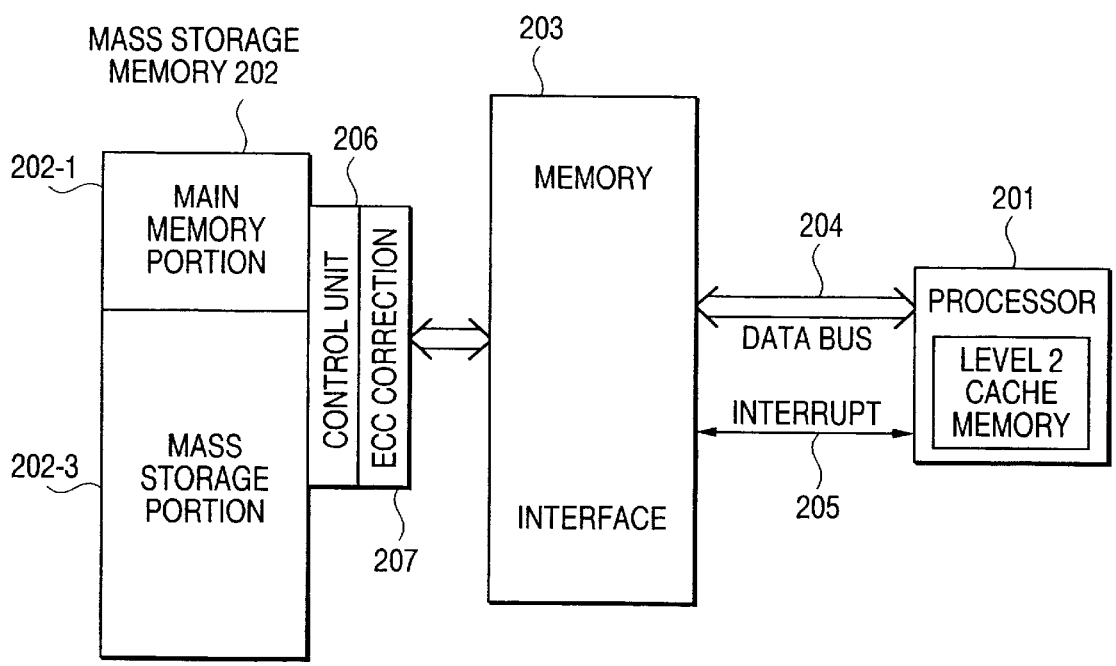
FIG. 2 is a block diagram illustrating the memory arrangement of a low-cost computing device according to an exemplary embodiment of the invention.

A simple block diagram of an exemplary memory architecture is provided in FIG. 2. Processor 201 may contain, or be coupled to, Level 1 and Level 2 cache (not shown) as known in the art. In particular, processor 201 may contain a large Level 2 cache. Mass storage memory 202 is configured into a first main memory portion 202-1 and a second mass storage portion 202-2. In a 10 GB mass storage memory, an exemplary configuration may be anywhere from 96 MB to 512 MB for the main memory portion with the remainder (9.5 GB–9.9 GB) for the mass storage portion. A common access control unit 206 for the main memory portion and mass storage portion is provided with ECC generation and checking/correction circuitry 207 so that the stored data can be checked and corrections made if required for each read or write operation of a sector.

Each portion of mass storage memory 202 may be organized into a plurality of sectors, with respective error correction code (ECC) information associated with each one of the sectors. The sectors of main memory portion 202-1 need not be the same size as the sectors of mass storage portion 202-2. However, for optimum performance in one example embodiment, the sectors in main memory portion 202-1 have the same size as the sectors in mass storage portion 202-2. As an example, these sectors may each be comprised of 512 bytes.

In some example embodiments, particularly with some storage technology and/or operating systems, the sector sizes of main memory portion 202-1 and mass storage portion 202-2 may be different (probably larger) than the cache line size of the cache memory associated with the processor. In yet other example embodiments, the sector size may be made identical to the cache line size if that is possible with mass storage technology employed in the embodiments.

Memory interface 203 handles and controls data transfers between processor 201 and mass storage device 202. It tranfers data to and from processor 201 via bus 204 and transfers control signals via a separate interrupt connection 205. It transfers data to and from each of main memory portion 202-1 and mass storage portion 202-2 through control unit 206 and ECC correction circuity 207.

Figure 3:
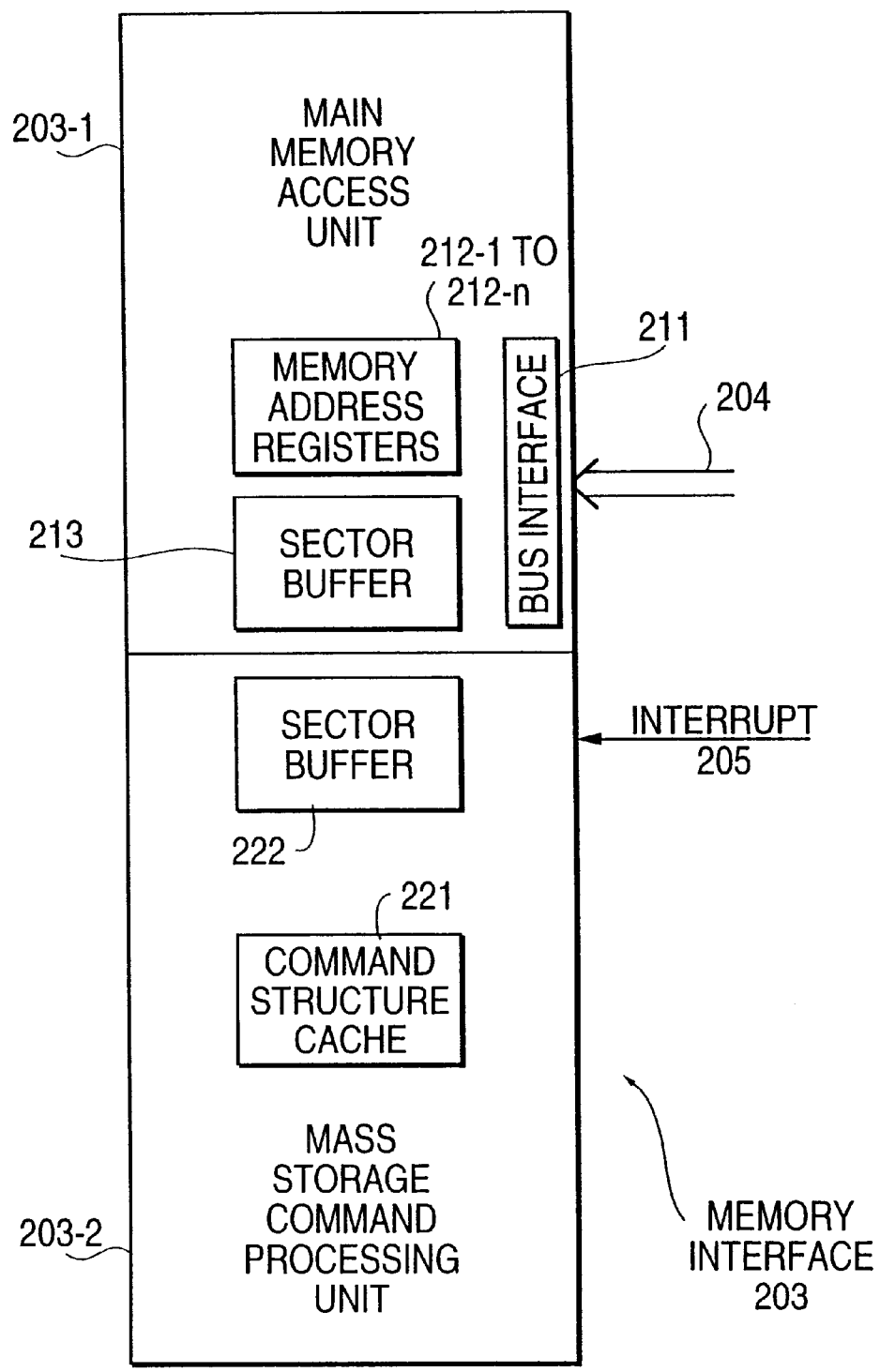
FIG. 3 is a diagram showing the components of an exemplary interface 203 in FIG. 2.

FIG. 3 shows an exemplary implementation of memory interface 203. Memory interface 203 may be divided into a main memory access unit 203-1 and a mass storage command processing unit 203-2. Main memory access unit 203-1 has a bus interface 211, address registers 212-1 to 212-n, and sector buffer 213. Mass storage command processing unit has a command structure cache 221 and a sector buffer 222. The memory bus 204 is connected to main memory access unit 203-1 via bus interface 211, and the interrupt connection 205 is connected to mass storage command processing unit 203-2. The memory interface 203 may be physically located with the mass storage device 202 or in a chipset (not shown).

Figure 4:
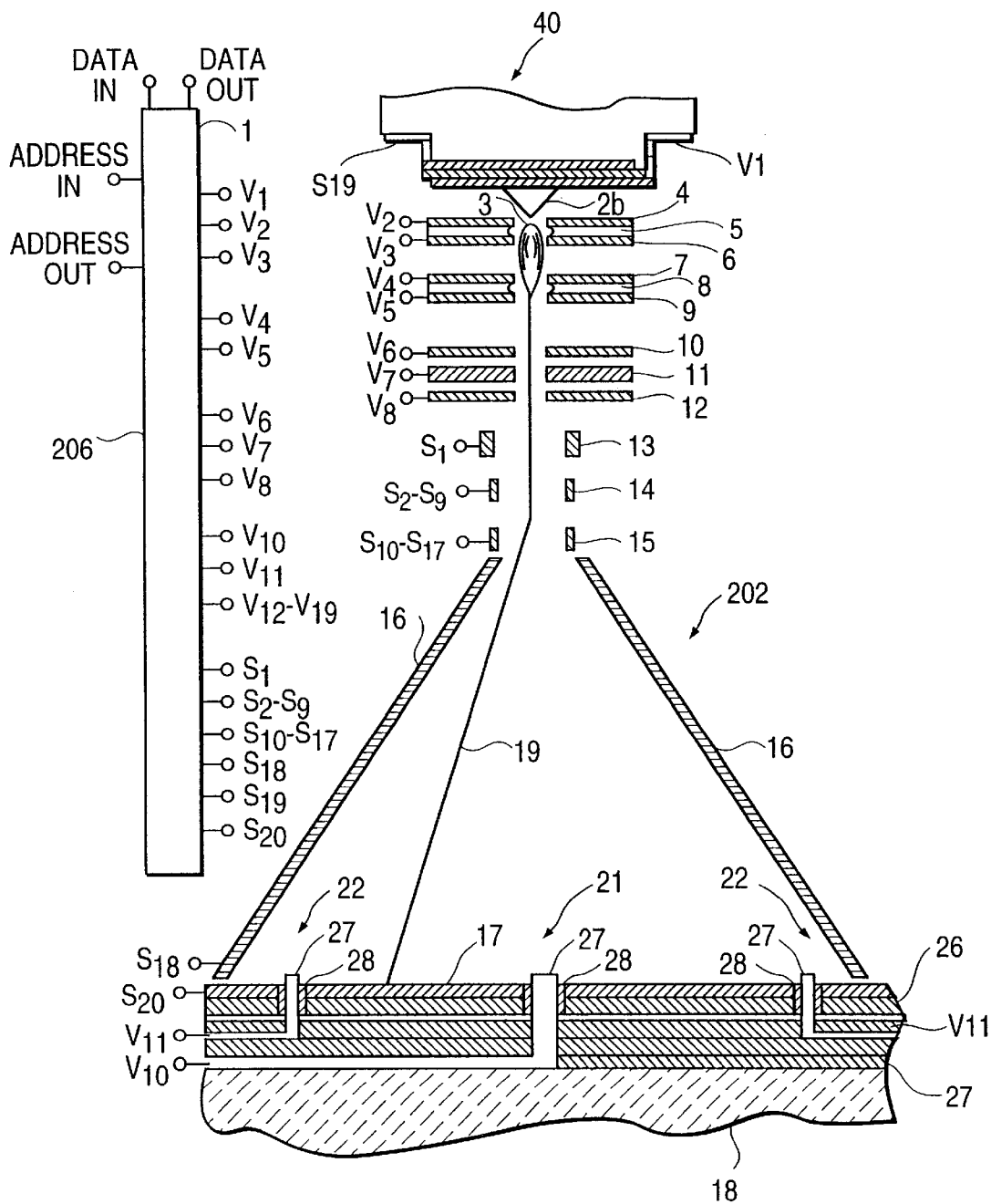
FIG. 4 is a diagram showing an exemplary mass storage device for use in the computing device of FIG. 2.

High speed mass storage memory 202 may consist of any architecture, using any currently existing or later developed technology. One exemplary embodiment may use an electron beam steering device such as is described in U.S. Pat. Nos. 5,446,687, 5,546,337 and 5,604,706. An illustration of the device described in those patents is reproduced in FIG. 4. As shown, it comprises a spin-polarized electron source 40, a tip 2b, an extractor 4, collimators 6, 7 and 9, electrostatic lenses 10, 11 and 12, and insulating elements 5 and 8. As also shown in FIG. 4, the mass storage memory further comprises a blanking element 13, coarse and fine microdeflectors 14 and 15, respectively, an electron detector 16, a data storage layer 17, and a substrate 18.

Control unit 206 includes a microprocessor or other control circuitry known in the art. Control unit 206 coordinates and sequences the various functions and operations performed by the mass storage memory, as will be explained in more detail below. Control unit 206 further serves to interface the mass storage memory 202 with the memory interface 203 via ADDRESS IN, DATA IN, and DATA OUT terminals. By this interfacing, control signals and data from interface 203 can be transmitted to and decoded by control unit 206 using necessary protocols. Control unit 206 can develop control responses and data, and return the data to interface 203 using necessary protocols.

Spin-polarized electrons 3 are collected in tip 2b. Tip 2b can comprise, for example, the tip of a scanning electron microscope or other similar device. Optionally, tip 2b has a small diameter, such as the diameter of a single atom. Each of spin-polarized electrons 3 has an electron magnetic field with a direction of polarization determined by the electron's spin. The direction of polarization of the electron magnetic field corresponds to one of first and second data values. For example, an upwardly polarized electron magnetic field can correspond to a data value of "1" while a downwardly polarized electron magnetic field can correspond to a data value of "0", or vice versa.

A potential V1 is applied by interface 203.

The strength of the potential V1 can be varied by control unit 206 to control the intensity and current of the spin-polarized electrons 3. A signal S19 is also applied by interface 203. Signal S19 controls the direction of polarization of the magnetic fields of the spin-polarized electrons 3. Interface 203 can vary the potential V1 and signal S19 during operation of the device to compensate for physical changes in the device and its environment over time.

The extractor 4, collimators 6, 7 and 9, electrostatic lenses 10–12, the blanking element 13, and the coarse and fine microdeflectors 14 and 15, respectively, each constitute, for example, an electrically conductive annular member defining an aperture. The extractor 4 extracts the spin-polarized electrons 3 from the tip 2b and collimators 6, 7 and 9 collimate the spin-polarized electrons 3 into a spin-polarized electron beam 19. The electrostatic lenses 10–12 focus the spin-polarized electron beam 19 and the coarse and fine microdeflectors 14 and 15, respectively, direct the spin-polarized electron beam 19 toward the data storage layer 17.

The environment through which the spin-polarized electron beam 19 travels may be an electrically nonconductive and nonionizing environment such as a vacuum. The environment can be any number of other environments known in the art which would not degrade, but may enhance, passage of the spin-polarized electron beam 19 from the electron source 40 to the data storage medium 17.

As shown in FIG. 4, the tip 2b is positioned so as to be perpendicular to the plane of the surface of the extractor 4, at the center of the extractor 4 aperture, and juxtaposed at or near the extractor 4 surface. The apertures of extractor 4 and collimator 6 can be on the order of 1 millimeter in diameter. However, larger or smaller diameters could also be used depending on the particular design of the data storage and retrieval device and the desired characteristics of the spin-polarized electron beam 19.

Insulating element 5 which comprises, for example, Si, or the like, is positioned between the extractor 4 and collimator 6 to separate their conductive surfaces. The diameter of the aperture of insulating element 5 may be slightly greater than the diameters of the apertures of extractor 4 and collimator 6 to reduce interaction of the insulating element 5 with magnetic fields produced in and electrons passing through the apertures of extractor 4 and collimator 6.

Potentials V2 and V3 are applied by interface 203 to the extractor 4 and collimator 6, respectively, to create an electrostatic field in the aperture of each. The position of the tip 2b relative to the electrostatic fields produced in the apertures of extractor 4 and collimator 6 induce the spin-polarized electrons 3 to jump from the tip 2b and pass through the apertures of extractor 4 and collimator 6.

Collimators 7 and 9 and insulating element 8, which can be similar or identical to extractor 4, collimator 6, and insulating element 5, respectively, constitute an optional lens stage to assist in collimating of the spin-polarized electrons 3 into the spin-polarized electron beam 19. Collimators 7 and 9 and insulating element 8 can also be used to accelerate or decelerate the spin-polarized electrons 3 to obtain a desired beam energy.

The potentials V2–V5 can be adjusted by control unit 206 to obtain desired characteristics of the spin-polarized electrons 3 and the spin-polarized electron beam 19. Control of the potentials V2–V5 can be performed during operation of the device to compensate for physical changes in the device and its environment over time.

After passing through collimator 9, the spin-polarized electron beam 19 passes through electrostatic lenses 10–12. Potentials V6–V8 are applied to the electrostatic lenses 10–12, respectively, by control unit 206 to create electrostatic fields through the lens apertures. These electrostatic fields focus the spin-polarized electron beam 19 with a desired diameter, e.g., 1–10 nanometers. The apertures of the electrostatic lenses 10–12 can be on the order of 1 millimeter in diameter but can be varied depending on the particular design of the data storage and retrieval device and the desired characteristics, e.g., intensity, beam shape, etc., of the spin-polarized electron beam 19. Furthermore, the thicknesses of the electrostatic lenses 10–12, their relative positions, and the potentials V6–V8 can be varied to obtain desired characteristics of the spin-polarized electron beam 19. Again, the potentials V6–V8 can be varied by control unit 206 during operation of the device to compensate for physical changes in the device and its environment over time. Further, the electrostatic lenses 10–12 can be replaced with fewer or more of such lenses. Also, magnetic lenses can be used in place of, or in addition to, the electrostatic lenses 10–12.

After passing through electrostatic lens 12, the spin-polarized electron beam 19 passes through the blanking element 13. As will be explained in more detail below, the blanking element 13 is an optional element which disables the effects of the spin-polarized electron beam 19. The location of the blanking element 13 may be above the coarse microdeflector 14, as shown in FIG. 4, to allow the spin-polarized electron beam 19 to achieve a steady state.

After passing through the blanking element 13, the spin-polarized electron beam 19 passes through the coarse microdeflector 14 and then the fine microdeflector 15. The coarse microdeflector 14 may comprise eight poles individually controlled by signals S2–S9 supplied by control unit 206.

Similarly, the fine microdeflector 14 may also comprise eight poles individually controlled by signals S10–S17 also supplied by control unit 206.

The coarse and fine microdeflectors 14 and 15, respectively, direct the spin-polarized electron beam 19 toward the data storage layer 17. While the coarse microdeflector 14 bends the trajectory of the spin-polarized electron beam 19 toward a general area on the data storage layer 17, the fine microdeflector 15 further adjusts the trajectory of the spin-polarized electron beam 19 to direct the spin-polarized electron beam 19 at a specific area of-the data storage layer 17. By gradually bending the spin-polarized electron beam 19 in this manner, distortions and aberrations introduced into the spin-polarized electron beam 19 can be reduced. It is contemplated that the fine microdeflector 15 can enable positioning of the spin-polarized electron beam 19 to the atomic level on data storage layer 17. Although the coarse and fine microdeflectors 14 and 15, respectively, have been described to comprise eight poles each, it is contemplated that the coarse and fine microdeflectors 14 and 15, respectively, can have other configurations known in the art. Further, the relative positions of the coarse and fine microdeflectors 14 and 15, respectively, and the data storage layer 17 can be determined as a function of X-Y axis scanning range of the spin-polarized electron beam 19.

While the foregoing detailed description has been provided for an example embodiment utilizing an electron beam storage device, it should be understood that any one of a number of different advanced mass storage devices may be utilized in an embodiment of the invention. In particular, an optical mass storage memory such as that described in, for example, patent documents WO 09733275 and WO 09724715, assigned to Opticom ASA or other advanced mass storage devices commercially available from Opticom ASA of Oslo, Norway. Indeed, the example embodiments of the invention are believed to have the advantage that they allow any currently existing or later developed mass storage technology, having performance characteristics such as to make it suitable for use as main memory as well as mass storage as described above, to be utilized in a computing device in a manner that makes the presence of the advanced mass storage device transparent to the central processor and operating system so that such operating system does not need to be rewritten to accommodate the advanced mass storage device.

Returning now to FIGS. 2 and 3, all data transfers with processor 201, regardless of whether they access main memory portion 202-1 or mass storage portion 202-2, are made through memory bus 204 and bus interface 211. The arrangement of main memory portion 202-1 and mass storage portion 202-2 are transparent to processor 201.

Read and write operations to main memory portion 202-1 are handled in a manner similar to that performed for conventional DRAM. Hardware registers 212-1 to 212-n decode the memory address signals and access type and immediately access main memory portion 202-1, taking priority over any contemporaneous accesses to mass storage portion 202-2.

In read operations from main memory portion 202-1 to processor 201, data is transferred from an entire sector into sector buffer 213 after the error correction code is used to check and correct data if necessary. From sector buffer 213, the requested data (which may be either a part or all of the error corrected data stored in sector buffer 213) is then transferred to the processor via bus 204. In embodiments where the cache line size is equal to the sector size of main memory portion 202-1, then all of the data may be transferred from sector buffer 213 to the cache associated with the processor.

The first step of a write operation writing data from processor 201 into a specified sector of main memory portion 202-1 depends upon whether the operation writes data into the entire sector or only a portion of the sector. In the case where data is to be written into the entire sector, then the write operation is carried out by transferring the data to sector buffer 213 and the entire sector in main memory portion 202-1 is rewritten with the data (and newly computed ECC so that error correction can be maintained for that sector).

In the case where data is to be written into only a portion of the sector, the operation first reads the entire sector of main memory portion 202-1 into sector buffer 213 (after the error correction code is used to check and correct data if necessary). Even though only a portion of the data in the sector is to be changed, the entire sector is read out into sector buffer 213 so that error correction can be maintained for the sector. The new data is then written into part of sector buffer 213, thus replacing the data read from the sector of main memory portion 202-1 with the new data. This step is followed by a write back of the entire sector with new ECC computed to main memory portion 202-1.

Read and write operations from and to mass storage portion 202-2 are somewhat more complicated. To invoke an operation involving mass storage portion 202-2, a first party DMA command protocol, like the industry draft specification SBP-2 from ANSI, is utilized. As specified in SBP-2, a command block is constructed in command structure cache 221, with either command structures in the block itself or pointers to the command structures. The command block includes a command, an address in mass storage portion 202-2 and an address in main memory portion 202-1. The address in main memory portion 202-1 may be contained in a scatter/gather table having pointers to memory addresses as known in the art for controlling memory space. The command block is stored in main memory portion 202-1 and mass storage command processing unit 203-2 maintains a pointer pointing to the location of the command block.

When a command is to be executed, a "doorbell" is rung (the mass storage memory is notified that there is a storage command to process). The device utilizes the pointer to get the command block, and then executes the command block, providing the result on a completion queue (ringing a doorbell/interrupt if the queue was empty).

A read operation for data in mass storage portion 202-2 includes a step of reading the entire sector at the storage location specified and writing the data in that sector to a specified location in main memory portion 202-1. Conversely, write operations for mass storage portion 202-2 involve reading a sector in main memory portion 202-1 and writing it to a sector in mass storage portion 202-2. The controller for the device has a sector sized buffer with which to temporarily store the data. The "disk" or storage access in an example embodiment of the invention executes very quickly by, first, taking advantage of the relatively fast speed of the electron beam and optical polymer memory storage devices, and second, eliminating much of the overhead associated with a storage interface by using the main memory like interface instead.

Accesses to the main memory portion 202-1 may be relatively slow as compared to a conventional DRAM arrangement, but it can be offset by the very fast access to mass storage portion 202-2 as compared to conventional disk drives. In addition, the comparatively large size which the combined main memory and mass storage device can configure for main memory portion 202-1 helps improve performance of operations accessing main memory and means there will be little paging.

The exemplary combined main memory and mass storage device described in this application may also provide a substantial reduction in device complexity and cost compared to the related art. The disk drive interface for the disk drive device and the DRAM interface for the DRAM memory in the related art are eliminated in lieu of a single interface, with corresponding savings in pin and physical space.

The exemplary combined main memory and mass storage memory also advantagously provides a main memory portion composed of non-volatile memory. This feature greatly reduces the amount of time needed for boot-up after the computing device is turned on, thus making the device immediately available for processing operations.

The exemplary computing device using the combined mass storage memory also has the advantage that power consumption is relatively low when compared to computing devices using equal amounts of DRAM. The power consumption of the exemplary computing device also does not increase in proportion to the size of installed memory as in conventional computing devices using DRAM.

Of course, the invention is not limited to personal computers. Indeed, the invention is particularly useful for computing devices requiring relatively large amounts of mass data storage but not requiring high main memory performance. Such devices may include laptops, palmtops, and consumer electronics containing large amounts of stored data.

Additional novel features of the invention may be apparent to those skilled in the art from the detailed description of the exemplary embodiments and claims when read in connection with the accompanying drawings. While the foregoing and following written and illustrated disclosure focuses on disclosing exemplary embodiments of the invention, it should be understood that the same is by way of illustration and example only, is not to be taken by way of limitation and may be modified in learned practice of the invention. While the foregoing has described what are considered to be exemplary embodiments of the invention, it is understood that various modifications may be made therein and that the invention may be implemented in various forms and embodiments, and that it may be applied in numerous applications, only some of which have been described herein. It is intended by the following claims to claim all such modifications and variations.

What is claimed is:

1. A memory device comprising:

a mass storage memory configured into a main memory portion and a mass storage portion; and a memory access unit, the memory access unit storing the configuration data marking a partition between the main memory portion and the mass storage portion of the mass storage device and controlling data transfer to and from the mass storage memory according to whether the data is located in the main memory portion or the mass storage portion.

2. A memory device according to claim 1, wherein a transfer of data to or from the main memory portion has priority over a transfer of data to or from the mass storage portion.

3. A memory device according to claim 1, wherein the memory access unit comprises a mass storage command processing unit which processes a command for the transfer of data to or from the mass storage portion.

4. A memory device according to claim 3, wherein the mass storage command processing unit initiates the transfer of data to or from the mass storage portion in response to the command.

5. A memory device according to claim 1, wherein said mass storage portion is configured to be more than sixteen times as large as said main memory portion.

6. A memory device according to claim 1, wherein said main memory portion is configured to be at least 512 MB.

7. A memory device according to claim 1, wherein said main memory portion and said mass storage portion are each composed of sectors having error correction code (ECC) information associated therewith.

8. A memory device according to claim 7, wherein the sectors of said main memory portion are a different size than the sectors of said mass storage portion.

9. A computing device comprising:

a processor;

a mass storage memory configured into a main memory portion and a mass storage portion; and a memory access unit, the memory access unit storing the configuration data marking a partition between the main memory portion and the mass storage portion of the mass storage device and controlling data transfers between said mass storage memory and to said processor according to whether the data is located in the main memory portion or the mass storage portion.

10. A computing device according to claim 9, wherein said memory access unit is included in a chipset.

11. A computing device according to claim 9, wherein a Level 2 cache memory is contained within said processor.

12. A computing device according to claim 9, wherein a transfer of data to or from the main memory portion has priority over a transfer of data to or from the mass storage portion.

13. A memory device according to claim 9, wherein the memory access unit comprises a mass storage command processing unit which processes a command for the transfer of data to or from the mass storage portion.

14. A memory device according to claim 13, wherein the mass storage command processing unit initiates the transfer of data to or from the mass storage portion in response to the command.

15. A memory device according to claim 9, wherein said mass storage portion is configured to be more than sixteen times as large as said main memory portion.

16. A memory device according to claim 9, wherein said main memory portion is configured to be at least 512 MB.

17. A memory device according to claim 9, wherein said main memory portion and said mass storage portion are each composed of sectors having error correction code (ECC) information associated therewith.

18. A memory device according to claim 17, wherein the sectors of said main memory portion are a different size than the sectors of said mass storage portion.

19. A method of transferring data between a processor and a mass storage portion of a combined mass storage device having a main memory portion as well as said mass storage portion, the method comprising the steps of:

sending a signal from the processor to a mass storage command processing unit connected to the combined mass storage device;

constructing a command block in a command structure cache in the mass storage command processing unit, said command block containing a command, an address of in the mass storage portion, and an address of the main memory portion;

storing said command block in said main memory portion and providing a pointer to said command block to the mass storage command processing unit;

reading the command block using the pointer; and transferring data by executing the command block.

20. A data transfer method according to claim 19, wherein, if the signal from the processor is for a read operation, the data is first transferred from the address of the mass storage portion contained in the command block to the address of said main memory portion contained in the command block and is then transferred to said processor.

21. A data transfer method according to claim 19, wherein, if the signal from the processor is for a write operation, the data is transferred from the address of said main memory portion contained in the command block to the address of the mass storage portion contained in the command block.

* * * * *